May 10, 1938.  G. NEUMANN  2,116,636

DEVICE FOR INDICATING THE AMOUNT OF MATERIAL IN A TANK

Filed Feb. 17, 1937

Inventor:
GEORG NEUMANN
BY
Richards & Geier
ATTORNEYS

Patented May 10, 1938

2,116,636

UNITED STATES PATENT OFFICE 2,116,636

DEVICE FOR INDICATING THE AMOUNT OF MATERIAL IN A TANK

Georg Neumann, Berlin, Germany

Application February 17, 1937, Serial No. 126,132
In Germany February 18, 1936

14 Claims.  (Cl. 73—290)

My invention relates to methods and devices for indicating the amount of material in one or a plurality of tanks which are adapted for use in vehicles, aircrafts and the like.

It is an object of my invention to provide methods and devices of the kind referred to which are accurate in operation and, more particularly, the results of which are independent of the inclination and velocity of the vehicle or aircraft. Furthermore the results do not depend upon the density or specific weight of the material in the tank.

The devices according to my invention involve the further advantage that the indicating scale may be calibrated so as to be independent of the particular shape of the tank the liquid content of which is to be ascertained.

With these objects in view my invention in its broadest aspect resides in producing pressure changes in the tank the content of which is to be ascertained and in an auxiliary tank and using the differences arising with regard to the velocities of pressure change in the tanks for operating an indicating device. As will be more fully explained hereinafter such indication depends on the amount of material present in the tank so that it may be used for ascertaining the same.

In the drawing affixed to this specification and forming part thereof two embodiments of a device according to my invention are diagrammatically illustrated by way of example.

In the drawing

Figure 1:
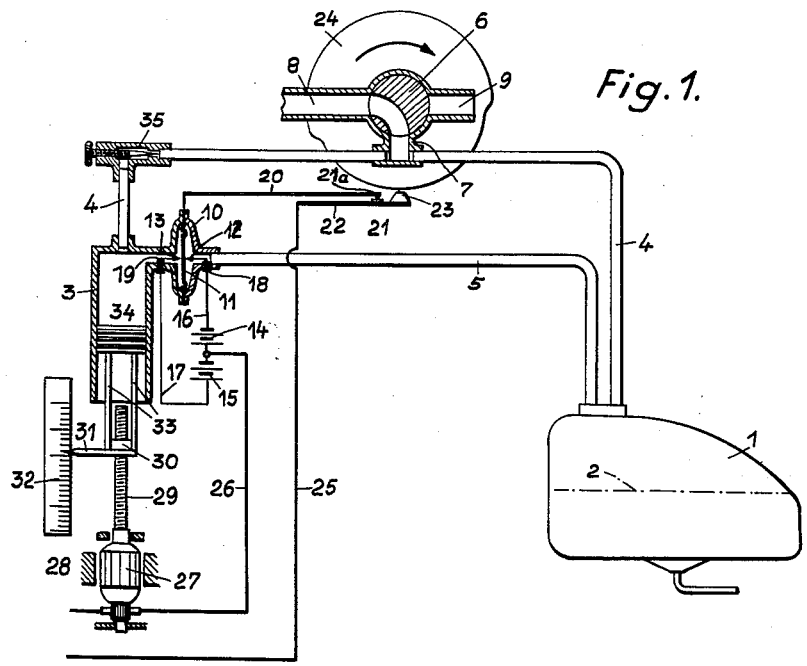
Figure 1 is a side elevation, partly in section, of a device according to my invention.

Referring now to the drawing and first to Figure 1, I is a tank containing a material, for instance a liquid such as petrol, the level of which is indicated by the dotted line 2.  3 is an auxiliary tank connected to the tank I by means of connecting pipes 4 and 5.  6 is the core of a two-way valve slowly rotated in the direction of the arrow by means of a suitable driving device (not shown).  Outlet 7 of the two-way valve communicates with the connection 4, the two inlet pipes 8 and 9 of the valve communicating with a pressure or suction supply (not shown) and the atmosphere, respectively. Thus by the rotation of the core 6, pipe 4 and tanks I and 3 will be alternately connected to the pressure or suction supply and the atmosphere. It should be understood that in this specification and claims a pressure supply is meant as a supply of a constant pressure above or below the pressure of the atmosphere.  10 is a casing inserted in connection 5 and enclosing a flexible diaphragm 11. 12 and 13 are electrical contact pieces arranged in casing 10 at opposite sides of diaphragm 11 and spaced apart from the latter by such distances that one of them makes contact with the diaphragm whenever the mid portion of the latter moves to the right or left, as the case may be. Contact piece 12 is electrically connected to one terminal of a D. C. supply such as battery 14, the other terminal of which is connected to one terminal of another D. C. supply such as battery 15 the other terminal of which is connected to contact piece 13. As will be seen from Figure 1, the terminals of the D. C. supplies 14 and 15, which are connected to each other have opposite polarities and the connections 16 and 17 connecting the contact pieces 12, 13 to the D. C. supplies 14, 15, respectively, traverse the wall of pipe 5 through insulating bushings 18 and 19. 20 is a connection electrically connecting diaphragm 11 to the fixed contact member 21a of a switch 21 the movable contact piece of which is attached to a leaf spring 22 tending to hold the switch in closed position.  23 is a dog secured to the end of leaf spring 22 and arranged near the edge of a cam 24 secured to the shaft of the core 6 of the two-way valve.  25 and 26 are electrical connections connecting the movable contact member of the switch 21 and the electrical connection of D. C. supplies 14, 15 to the rotor 27 of a polarized D. C. motor 28, respectively. Thus it will be seen that the rotor 27 will be rotated in one or the opposite direction whenever diaphragm 11 makes contact with contact piece 12 or 13, respectively, provided that switch 21 is closed.  29 is a threaded spindle driven by rotor 27 of motor 28 and engaging a nut 30 carrying a pointer 31 cooperating with a scale 32.  34 is a piston forming a movable bottom of auxiliary tank 3 and connected to nut 30 by means of rod 33.  35 is a needle valve for adjusting the effective cross-section of connecting pipe 4 and is set in the manner pointed out hereafter.

The operation of the device is as follows:

As pointed out above, the cock 6 is slowly rotated in the direction of the arrow. In consequence thereof the main tank I as well as the auxiliary tank 3 are alternately and periodically connected to the pressure or suction supply connected to inlet 8 and the atmosphere with which tube 9 communicates. Thus at every full rotation of the cock the pressures in both tanks are once increased and decreased. The pressures, however, will change in the two tanks in phase to each other only if the ratio of the free volumes within the tanks that is of the volume in tank 1 not occupied by the liquid and the volume of tank 3 as defined by the position of piston 34 is equal to the ratio of the resistances to flow existing in the pipes 4 and 5. If the pressure changes in the two tanks are in phase with each other the diaphragm 11 will remain in its neutral position shown in Figure 1. If, however, this balance is disturbed, e. g. by an alteration of the amount of liquid present in tank 1, the pressure will change in this tank more slowly than in the auxiliary tank 3 so that during the period of rising pressure the pressure in the auxiliary tank 3 will exceed the pressure in tank 1. Thus during this period the diaphragm 11 will make contact with contact piece 12 and motor 28 will be started. Be it assumed that the polarization of the motor is chosen in such manner that by this rotation of the rotor 27 nut 30 and piston 34 are lowered so that the volume of tank 3 is increased and the pressure therein accordingly reduced which will tend to reestablish the balance of pressures in the tanks. In the event that during the period of rising pressure this balance is not completely reached, during the subsequent period of falling pressure which is initiated by the rotation of the core 6 the pressure will fall in tank 1 more slowly than in tank 3 so that diaphragm 11 will make contact with contact piece 13. This would cause rotor 27 to rotate in a direction so as to raise nut 30 and piston 34 unless in the meantime switch 21 had been opened by cam 24. Thus during this period of falling pressure nut 30 and piston 34 do not move, but during the subsequent second period of rising pressure the operation described above in connection with the first period of rising pressure will be repeated and so on until the ratios of the free volumes of the tanks becomes equal to the ratio of the resistances to flow in the pipes 4 and 5. The change of volume of tank 3 is indicated by pointer 31 on scale 32 the calibration of which may be uniform and independent of the shape of tank 1. The needle valve 35 is set in the following manner: The process described above is carried out with tank 1 empty and needle valve 35 is adjusted in such manner that pointer 31 coincides with the zero-mark of scale 32.

As will be seen from the foregoing description the indicating device is operated only during the periods of rising pressure, the motor circuit being interrupted during the periods of falling pressure. It should, however, to be understood that, if desired, the periods of falling pressure may be used for operating the indicating device. This may be done, for instance, by arranging the cam on the shaft of the core of the two-way valve with an angular displacement of 180° with respect to its position shown in Figure 1.

By this method the total amount of a liquid in a plurality of tanks may be measured by connecting the tanks to one another by means of a common pipe.

If desired, the process may be carried out with an auxiliary tank of invariable volume by connecting the nut 30 to the needle of needle valve 35 so that the change of adjustment of the needle indicates the free volume in tank 1. In this case, of course, the preliminary setting is done by suitably adjusting the piston 34.

If the device is used in an aircraft the required pressure may be obtained by using the relative wind.

If desired, however, the required changes of pressure may be produced by directly connecting pipes 4 and 5 to a cylinder in which a piston periodically reciprocates, the two-way valve being dispensed with.

If desired, pipe 9 may communicate with a container in which a constant pressure is maintained which differs from that of the supply to which pipe 8 is connected.

The diaphragm 11 may control the pointer and the piston by mechanical, e. g. hydraulic means instead of the electrical ones shown in Figure 1.

In the device shown in Figure 1 the small cross-section of pipe 4 particularly in the neighbourhood of the needle valve 35 must be the smaller the smaller the auxiliary tank is. In consequence thereof at sudden changes of temperature water may condense in the pipe 4 and be frozen to ice which, of course, will alter the resistance of flow of the pipe and thus cause inaccurate indications. This draw-back is avoided by the modified embodiment of the device shown in Figure 2.

Figure 2:
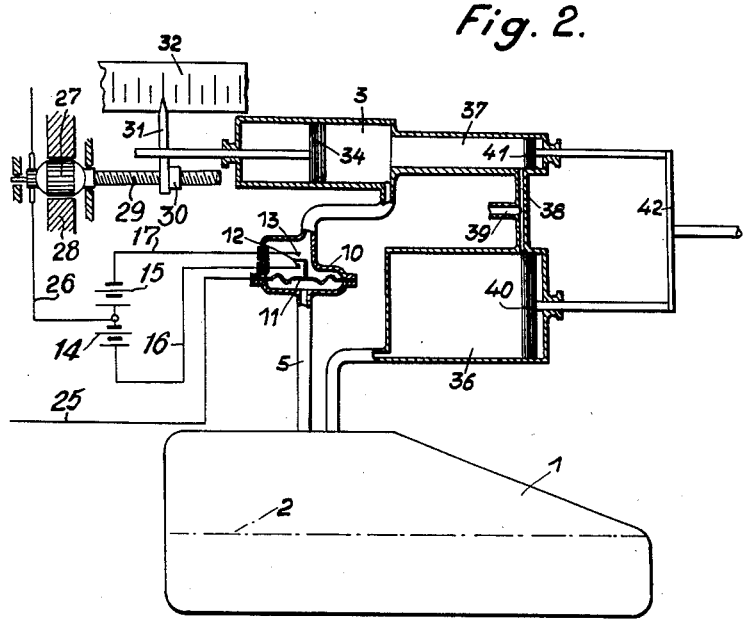
Figure 2 is a diagrammatical sectional elevation of a modified device according to my invention which is adapted to give accurate indications even at abrupt changes of temperature.

In Figure 2, the main tank 1 is connected to the auxiliary tank 3 as in Figure 1 by means of a pipe 5 in which the casing 10 enclosing the diaphragm 11 and contact pieces 12, 13 is inserted. The diaphragm controls the movement of piston 34 in the same manner as described in connection with Figure 1. 36 and 37 are cylinders communicating with tanks 1 and 3, respectively, and with each other through a pipe 38 provided with an outlet 39 leading to the atmosphere or a pressure supply (not shown). 40 and 41 are pistons arranged for reciprocation in the cylinders 36 and 37, respectively. The pistons are connected to a common yoke which is periodically reciprocated by means of a suitable driving device (not shown). As will be seen from Figure 2, the connecting pipe 38 is arranged in such manner that the connection of the cylinders 36 and 37 with each other and the outlet 39 is established only when the pistons 40 and 41 are in their end positions shown in Figure 2.

The operation of this device is as follows:

The pistons 40 and 41 are periodically and simultaneously reciprocated in the cylinders 36 and 37 and thus produce pressure rises and falls in the tanks 1 and 3 according to their direction of stroke. If the ratio between the volume change caused by piston 41 and the volume of tank 3 is equal to the ratio between the volume change caused by piston 40 and the free volume in tank 1, equal pressures will act upon diaphragm 11 from both sides at any time. If, however, the free volume in tank 1 is altered by changing the amount of the liquid in said tank, different pressures will act upon the two sides of the diaphragm which will now operate in the manner described in connection with Figure 1, and cause a displacement of pointer 31 and piston 34. In the end position of pistons 40 and 41 the pressures in the tanks and cylinders are equalized to one another and to the atmosphere or to the pressure supply connected to pipe 39.

To connect pipe 39 to a pressure supply other than and exceeding the atmosphere is particularly advantageous if the walls of tank 1 are not rigid or if the apparatus is used at a high altitude on an aircraft or the like.

Having thus described my invention I claim:

1. A device for ascertaining the material contents of a closed tank comprising a tank, an auxiliary tank, means connected with the two tanks for producing pressure changes therein, means connected with the two tanks and responsive to the difference between the velocities of the pressure changes in said tanks, an indicating means, and means connected with the second-mentioned and the third-mentioned means for operating the third-mentioned means in dependency upon said difference.

2. A device as claimed in claim 1, wherein the second-mentioned means comprise a pipe connecting said tanks and a flexible diaphragm in said pipe.

3. A device for ascertaining the material contents of a closed tank comprising a tank, an auxiliary tank, means connected with the two tanks for producing pressure changes therein, a pipe connecting said tanks, a flexible diaphragm in said pipe, an indicating means, and electrical means connected with said diaphragm and said indicating means for operating said indicating means in dependency on the position of said diaphragm.

4. A device for ascertaining the material contents of a closed tank comprising a tank, an auxiliary tank, means connected with the two tanks for producing pressure changes therein, a pipe connecting said tanks, a flexible diaphragm in said pipe, an indicating means, a displaceable piston forming the bottom of said auxiliary tank and being rigidly connected to said indicating means, and electrical means connected with said diaphragm and said indicating means for operating said indicating means in dependency on the position of said diaphragm.

5. A device as claimed in claim 1, wherein the first-mentioned means comprise a pipe connecting said tanks and means in said pipe for adjusting the resistance to flow of said pipe.

6. A device as claimed in claim 1, wherein the first-mentioned means comprise a pipe connecting said tanks, and a multiple-way valve in said pipe for connecting said pipe alternately to a plurality of pressure supplies of different pressures.

7. A device as claimed in claim 1, wherein the first-mentioned means comprise a pipe connecting said tanks, a multiple-way valve in said pipe for connecting said pipe alternately to a plurality of pressure supplies of different pressures and driving means for periodically changing over said valve from one position to another.

8. A device as claimed in claim 1, wherein the first-mentioned means comprise a pipe connecting said tanks, a multiple-way valve in said pipe for connecting said pipe alternately to a plurality of pressure supplies of different pressures, driving means for periodically changing over said valve from one position to another and means coupled to said valve driving means for periodically making inoperative said operating means for said indicating means.

9. A device as claimed in claim 1, wherein the first-mentioned means comprise two pumps for changing the pressures in said tanks, respectively, and means for simultaneously driving said pumps.

10. A device as claimed in claim 1, wherein the first-mentioned means comprise two pumps for changing the pressures in said tanks, respectively, means for simultaneously driving said pumps and means for periodically connecting said tanks to each other and to a pressure supply.

11. A device as claimed in claim 1, wherein the first-mentioned means comprise two pumps for changing the pressures in said tanks, respectively, means for simultaneously driving said pumps and means for periodically connecting said tanks to each other and to the atmosphere.

12. A measuring device, comprising a closed receptacle, an auxiliary receptacle, an indicating device, means connected with the two receptacles for providing changes in pressure therein, and means connected with the two receptacles and said indicating device for operating said indicating device in dependency upon the difference between the velocities of the pressure changes in the two receptacles.

13. A measuring device, comprising a closed receptacle, an auxiliary receptacle, an indicating device, means connected with the two receptacles for periodically producing pressure changes therein, and means connected with the two receptacles and said indicating device for operating said indicating device in dependency upon the difference between the velocities of the pressure changes in the two receptacles.

14. A measuring device, comprising a closed receptacle, an auxiliary receptacle, an indicating device, means connected with the two receptacles for periodically producing consecutive rises and drops in pressure therein, and means connected with the two receptacles and said indicating device for operating said indicating device only during one of these changes in dependency upon the difference between the velocities of that change in the two receptacles.

GEORG NEUMANN.